United States Patent
Abraham et al.

(10) Patent No.: US 10,506,052 B2
(45) Date of Patent: Dec. 10, 2019

(54) SYSTEMS AND METHODS FOR SESSION STATE TRANSFER TO A MOBILE DEVICE

(71) Applicant: Siemens Healthcare Diagnostics Inc., Tarrytown, NY (US)

(72) Inventors: Bestin Abraham, Newark, DE (US); Robert T. McKeever, Landenberg, PA (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 85 days.

(21) Appl. No.: 14/915,759

(22) PCT Filed: Jul. 22, 2014

(86) PCT No.: PCT/US2014/047594
§ 371 (c)(1),
(2) Date: Mar. 1, 2016

(87) PCT Pub. No.: WO2015/047523
PCT Pub. Date: Apr. 2, 2015

(65) Prior Publication Data
US 2016/0198004 A1    Jul. 7, 2016

Related U.S. Application Data

(60) Provisional application No. 61/883,359, filed on Sep. 27, 2013.

(51) Int. Cl.
*G06F 15/16* (2006.01)
*H04L 29/08* (2006.01)
(Continued)

(52) U.S. Cl.
CPC ......... *H04L 67/148* (2013.01); *G06F 3/0484* (2013.01); *H04L 41/22* (2013.01); *H04L 67/14* (2013.01)

(58) Field of Classification Search
CPC ....... H04L 67/148; H04L 41/22; H04L 67/14; G06F 3/0484
(Continued)

(56) References Cited

U.S. PATENT DOCUMENTS 6,718,535 B1    11/2004    Underwood
7,027,997 B1    4/2006    Robinson et al.
(Continued)

OTHER PUBLICATIONS

T. Phan, R. Guy, J. Gu and R. Bagrodia, "A new TWIST on mobile computing: Two-Way Interactive Session Transfer," Proceedings . The Second IEEE Workshop on Internet Applications. WIAPP 2001, San Jose, CA, USA, 2001, pp. 2-11. (Year: 2001).*
(Continued)

*Primary Examiner* — Taylor A Elfervig

(57) ABSTRACT

The session-state of a local user interface is transferred to a mobile device to permit an operator to execute remote tasks while maintaining interaction with a central controller. The session-state can be transferred between a user interface that is local to a central controller and a mobile computing device using indicia provided by the local user interface or the mobile computing device. The session is identified by the indicia, which is detected by a sensor in the local user interface or the mobile computing device to transfer session-state therebetween. Session-state can be advanced or influenced by, input at one platform at a time. Execution of control can continue regardless of the location of session-state interaction. The indicia used to transfer session-state between platforms can be provided in the form of a key or token that includes identifying information for the session.

18 Claims, 2 Drawing Sheets

(51) Int. Cl.
  *G06F 3/0484* (2013.01)
  *H04L 12/24* (2006.01)
(58) Field of Classification Search
  USPC ........................................................ 709/227
  See application file for complete search history.

(56) References Cited

U.S. PATENT DOCUMENTS

| | | | | |
|---|---|---|---|---|
| 8,150,387 | B2* | 4/2012 | Klein | H04N 21/43615 455/420 |
| 9,037,850 | B2* | 5/2015 | Ziv | H04L 63/18 713/159 |
| 2004/0031033 | A1* | 2/2004 | Chandra | G06F 9/542 718/102 |
| 2006/0064188 | A1 | 3/2006 | Ushiku et al. | |
| 2007/0208862 | A1* | 9/2007 | Fox | H04L 67/14 709/227 |
| 2010/0107164 | A1* | 4/2010 | Koskimies | G06Q 10/10 718/100 |
| 2011/0040836 | A1* | 2/2011 | Allen | H04L 65/1093 709/205 |
| 2012/0110676 | A1 | 5/2012 | Halbersttadt | |
| 2012/0290663 | A1 | 11/2012 | Hsieh et al. | |
| 2013/0018682 | A1 | 1/2013 | Reddington et al. | |
| 2013/0046893 | A1 | 2/2013 | Hauser et al. | |
| 2013/0110676 | A1 | 5/2013 | Kobres | |

OTHER PUBLICATIONS

I. Mas, V. Berggren, R. Jana, J. Murray and C. W. Rice, "IPTV session mobility," 2008 Third International Conference on Communications and Networking in China, Hangzhou, 2008, pp. 903-909. (Year: 2008).*

De Keukelaere, F. et al., "MPEG-21 Session Mobility on Mobile Devices," IFIP TC6 Workshops on Broadband Satellite Communication Systems and Challenges of Mobility, pp. 135-144, Aug. 2004, 7 pages. (Year: 2004).*

Sujeet Mate, Umesh Chandra, and Igor D. D. Curcio. 2006. Movable-multimedia: session mobility in ubiquitous computing ecosystem. In Proceedings of the 5th international conference on Mobile and ubiquitous multimedia (MUM '06). ACM, New York, NY, USA, Article 8 (Year: 2006).*

International Search Report for PCT/US2014/047594 dated Nov. 13, 2014.

* cited by examiner

SYSTEMS AND METHODS FOR SESSION STATE TRANSFER TO A MOBILE DEVICE

BACKGROUND OF THE INVENTION

In environments that call for an operator to perform various tasks that are located a distance from a control console, it is sometimes challenging to coordinate control intervention with performance of the remote tasks. For example, in a laboratory environment situations often arise where a task demands interaction with a central computer display in conjunction with a set of physical activities that are performed at a distance from the display. Accordingly, an operator may be tasked with attending to a multiple-module in vitro diagnostic instrument system, which places a number of demands on the operator. For example, the operator may obtain a list of reagents from the central display, acquire the reagents from a storage area or refrigerator, pause the in vitro diagnostic instrument at the central display, place the reagents on the module, and return to the central display to acknowledge completion of the operation.

In such environments as the one described above, the operator is tasked with activities that occur remotely from a central console, while operations for the system are controlled at the central console.

SUMMARY OF THE INVENTION

The session-state of a local user interface is transferred to a mobile device to permit an operator to execute remote tasks while maintaining interaction with a central controller. The session-state can be transferred between a user interface that is local to a central controller and a mobile computing device using indicia provided by the local user interface or the mobile computing device. The session is identified by the indicia, which is detected by a sensor in the local user interface or the mobile computing device to transfer session-state therebetween. Session-state can be advanced or influenced by input at one platform at a time. Execution of control can continue regardless of the location of session-state interaction. The indicia used to transfer session-state between platforms can be provided in the form of a key or token that includes identifying information for the session.

The indicia by which the session-state can be transferred can be implemented in accordance with numerous paradigms, including, for example, RFID, a QR code or 2D bar code and scanner or camera, infrared transmissions, near field sensors as well as wired and wireless network connections, to name a few. Standard mobile computing devices may be used as the mobile platform including, for example, smartphones. Upon transfer of the session-state, the platform being relieved of the session-state control can be locked to prevent input/output interaction or control conflicts between the platforms.

BRIEF DESCRIPTION OF THE SEVERAL VIEWS OF THE DRAWINGS

The present disclosure is described in greater detail below, with reference to the accompanying drawings, in which.

DETAILED DESCRIPTION

The present application claims benefit of provisional application Ser. No. 61/883,359, filed Sep. 27, 2013, the entire disclosure of which is hereby incorporated herein by reference.

In a computing environment, a software application often proceeds from state to state, as in the case of a state machine, for example, based on detection of various events such as input provided by a user or device, which can be internal or external to the computing environment. State changes are sometimes referred to as transactions, where information is exchanged between two or more components in a computer control system. User initiated state changes can sometimes be implemented through a user interface, such as by a user providing an input to prompt a transaction or state change. The presentation of information in the user interface may sometimes refer to a session. A session is thus sometimes described in terms of an operation instance that involves communication between components, which components may include a user interface operated by a user. A session in a computing environment may be viewed as a control paradigm that involves communication between components. Accordingly, a distinction can be made between a control portion of a session and a communication or interaction portion of a session. For example, some resources in a session can be dedicated to control, while other resources in a session can be dedicated to communication. In accordance with the present disclosure, a communication portion of a session can be redirected or distributed among different devices. Portions of a session can be implemented as a separate process or thread in a computer architecture system to contribute to differentiating portions of a session.

An application may interact with a user interface with a session model, so that a user at the user interface may participate in a workflow session. The workflow session typically progresses through a number of states in accordance with the application programming, as the user or other devices provide input to the session and receive output or feedback. For example, a user may initiate a workflow session in a distributed computing environment that is constructed with a number of interconnected devices. The workflow session may be initiated at a central console that includes a user interface that permits the user to observe status of the workflow session, and provide input, or otherwise progress the state of the workflow session. One or more of the interconnected devices may also receive commands from and provide feedback to the central console, which may also be used to progress a workflow session state. In such a scenario, the application receives input from and provides output to a number of devices, including the user interface. In accordance with the present disclosure, input to/output from the user interface can be redirected to the mobile device, which can advance the state of the workflow session.

Figure 1:
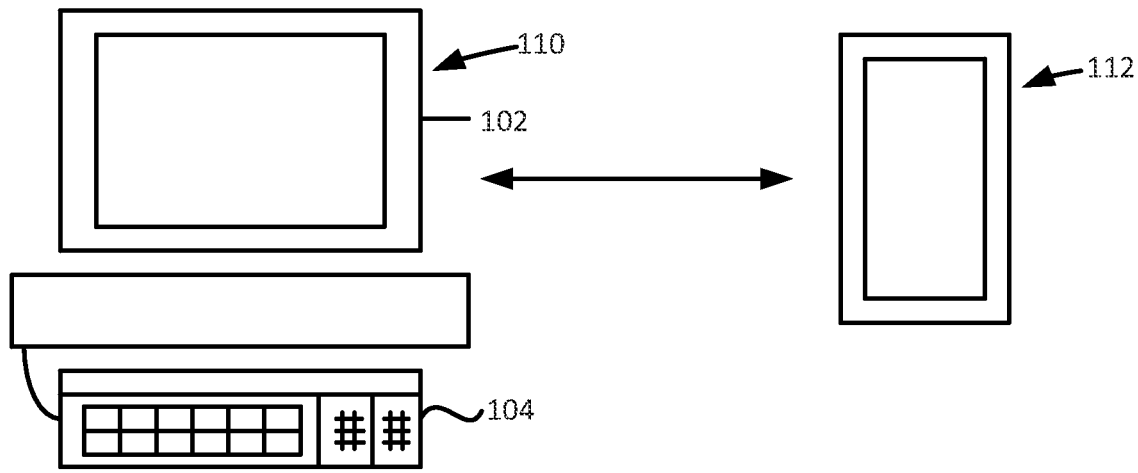
FIG. 1 is a diagram illustrating physical interaction between a control console and a mobile device in accordance with the present disclosure.

Referring now to FIG. 1, a central console 110 is illustrated as interacting with a mobile device 112. Console 110 represents a user interface with which a user can interact to contribute to controlling a workflow session. Console 110 includes display 102 as an output device that outputs information to a user with respect to a state of the workflow session. The user can provide input from an input device, such as keyboard 104, which input may be used to control the state of the workflow session implemented with an application running on console 110. In accordance with the present disclosure, console 110 can provide an output that can be received by mobile device 112 to cause a session-state transfer from console 110 to mobile device 112. The output provided by console 110 can be implemented according to a number of different forms, including via a wired/wireless network, near-field and RFID communication, infrared communication, a direct wireless or wired connection, by providing a bar code or QR code that can be read by mobile device 112, and any other type of communication link that can serve to transfer information between console 110 and mobile device 112.

Figure 2:
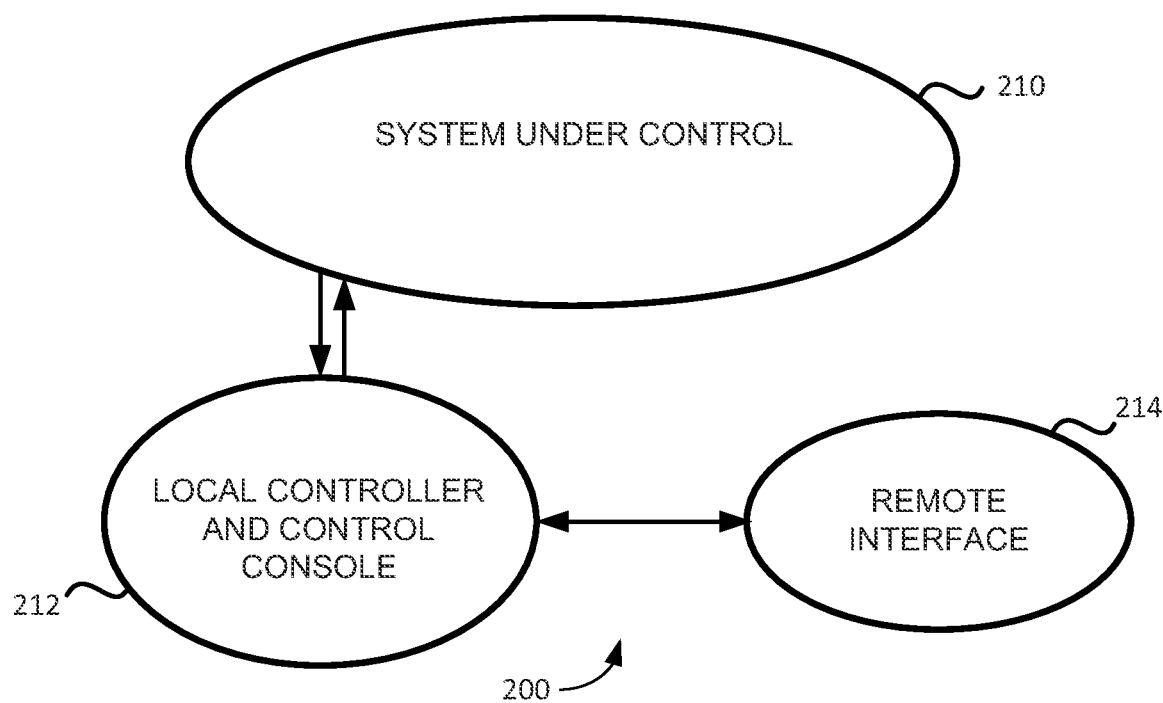
FIG. 2 is a conceptual diagram of interaction between components in accordance with the present disclosure.

Referring now to FIG. 2, a conceptual relationship 200 of architectural components is illustrated. A system under control 210 interacts with a local controller and control console 212 to provide control and feedback for system 210. Controller and console 212 represents the application running on console 110 to provide control and receive feedback for system 210, as well as to operate and interact with a user interface (not shown). Accordingly, local controller and control console 212 may be implemented as console 110, or as an application running on console 110. In accordance with the present disclosure, a session-state transfer can be implemented to transfer a session-state to a remote interface 214. Remote interface 214 can be implemented as mobile device 112, or as an application running thereon, for example. Upon initiation of a session-state transfer, controller and console 212 provides and remote interface 214 receives information for executing the transfer. According to some embodiments, controller and console 212, upon transfer of the session-state, prevents further local input from a local control console and accepts input from and provides output to remote interface 214. In such an instance, local controller and control console 212 may maintain control operations for system 210 in the absence of local input. Accordingly, remote interface 214 can act as a substitute user interface for local controller and control console 212, and can observe and/or influence the state of the workflow session, such as by advancing the state with user input to remote interface 214.

The transfer of session-state to a mobile device, such as mobile device 112, can be achieved in accordance with an exemplary embodiment by generating or obtaining a session token or a key that describes the state of the workflow session. Such a token can be digital, and can be constructed with information to identify the session, the current state of the session, a computing environment and any other information that can be used to successfully transfer user interface I/O to another device. Such a token can be generated or obtained for each state of the workflow session, so that a token is available for state transfer at an arbitrary point in the workflow session. Alternatively, or in addition, the token can be generated or obtained in response to a prompt to initiate session-state transfer. Security can be established for creation or transfer of the token, such as by requiring a user login to initiate a state-transfer, or by encrypting the token and providing the encryption capability at the target device. The target device can be identified as authorized by console 110 or local controller and control console 212, so that state-transfer is preauthorized. Moreover, a mobile device, such as mobile device 112, to which a session-state is transferred can be provided with security to permit initiation of the state-transfer. For example, mobile device 112 can be configured to require a user login to access a transfer facility, or can be provided with specific software that authorizes the session-state transfer.

The token used for state-transfer can include a session ID that uniquely identifies the workflow session, as well as information related to a particular user's authorization level or preferences. The token may also be constructed to include system parameters, or information that identifies a status of various devices that are connected to a central console, such as console 110. In general the token includes sufficient information to permit another device to recognize a state of a workflow session, so as to present appropriate output to the device and respond appropriately to input from the device to potentially modify the state of the workflow session. Accordingly, the device to which the token is provided may implement specialized software and/or hardware that recognizes workflow process states, and can identify a current state associated with a received token.

Various methods and techniques are available for transferring the token from the central console, such as console 110, to a remote interface, such as mobile device 112. According to some embodiments, the token is encoded as a one or two dimensional barcode or QR code that can be scanned and interpreted by mobile device 112, for example. In such embodiments, display 102 is used to display the barcode, and mobile device 112 can capture the barcode via an image capture device such as a camera, which is available with mobile device 112. The token may also be sent via a network connection including an RFID-type connection, an internet, a Wi-Fi connection, an IR port, a USB port, or any other type of convenient connection that permits transfer of token information from console 110 to mobile device 112.

Once the token is transferred to mobile device 112, for example, software executing on mobile device 112 interprets a state of the workflow session using the information contained in the token. According, mobile device 112 may include software that emulates at least a portion of the user interface associated with console 110. A user of mobile device 112 can thus observe and influence the state of the workflow session using mobile device 112, and need not be located directly at console 110 in order to do so.

Figure 3:
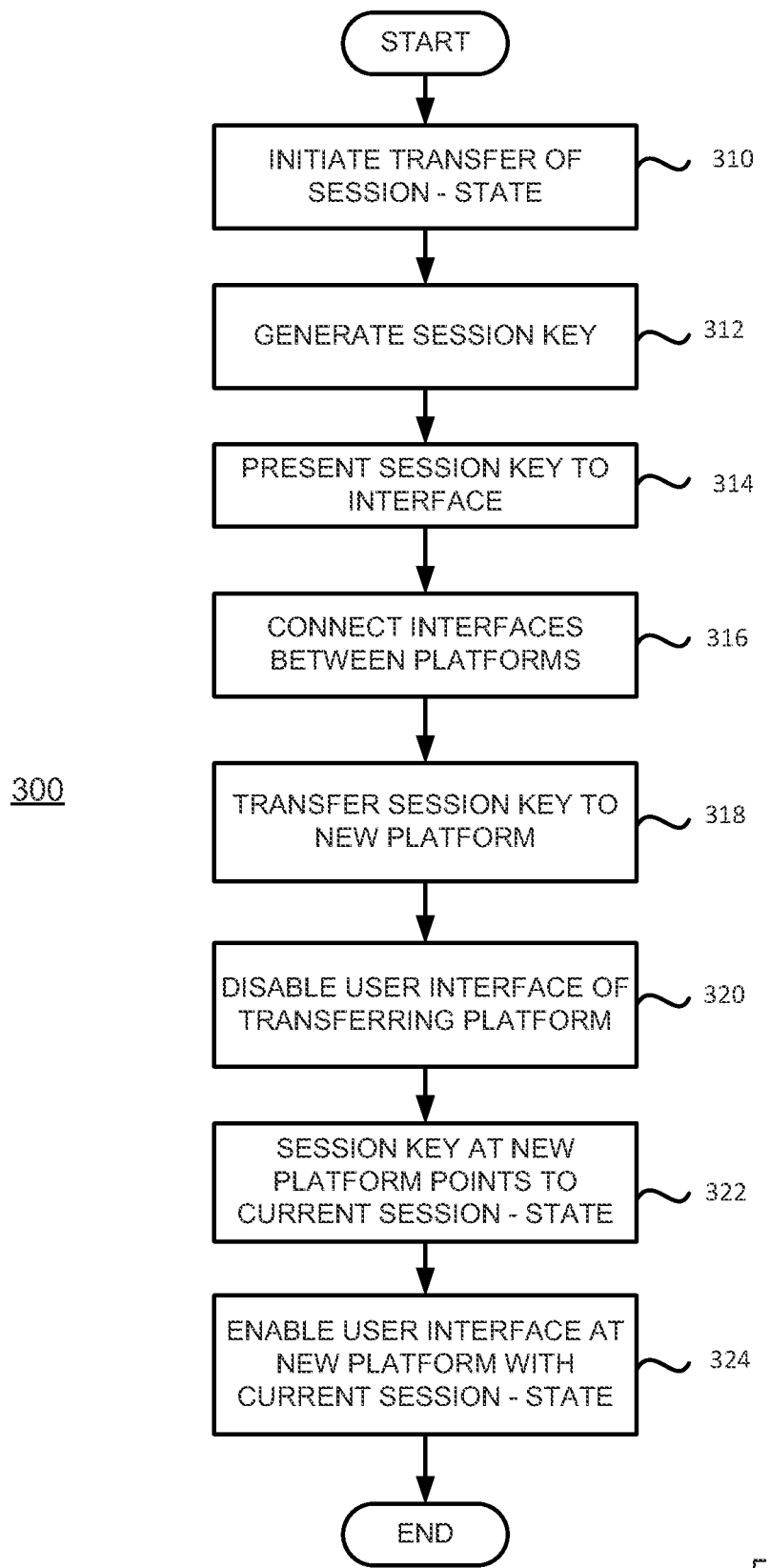
FIG. 3 is a flowchart illustrating a process for session-state transfer in accordance with the present invention.

Referring now to FIG. 3, a flowchart 300 illustrates a process in accordance with the present disclosure. The process illustrated in flowchart 300 begins with the initiation of a transfer of the session-state for a workflow session, as illustrated in a block 310. The initiation of a session-state transfer can be prompted at a local controller, such as console 110, or can be prompted remotely such as by using mobile device 112.

Once the session-state transfer is initiated, a token or session key is generated as illustrated in a block 312. The session key may also be obtained from a listing of session keys that describe each of the states of the workflow session. For example, a session key can be generated for each state of a workflow session and describe or indicate changes in status for interconnected devices, inputs, outputs, as well as identify the session. Accordingly, multiple session keys may be generated or obtained in accordance with the present disclosure. Moreover, multiple sessions may be implemented, controlled and/or transferred in accordance with the present disclosure by generating or obtaining appropriate session keys describing those sessions.

Once a session key is generated or obtained, it is presented to a communication interface, as shown in a block 314. The presentation of the session key to a communication interface may be implemented in accordance with any known techniques, including communication with a direct-connect or wireless link, presentation of a bar code, audio code, IR code, or any other type of protocol and/or communication platform that can be used to transfer information. A block 316 illustrates the connection of interfaces between platforms, for example, establishing a connection or transferring information between console 110 and mobile device 112.

The transfer of the session key to the new platform is illustrated in a block 318, where the receiving platform, which can be mobile device 112, obtains the session key that identifies the session-state of the workflow session.

Upon transfer of the session key, the central console may disable the user interface from receiving input, to avoid ambiguous or conflicting input commands, as illustrated in a block 320. Disabling input from the user interface can be implemented by blocking inputs from an input device, or reading and discarding the inputs. For example, in a Windows environment, an input handler can be configured to read inputs from a keyboard or mouse as is normally done, and then avoid transfer of the input to the workflow session application, so that input to the central console appears to be disabled.

The session key obtained by the receiving platform is interpreted to identify the session and the state of the session to permit implementation of an interactive user interface at the new platform. Inputs and outputs at the new platform affecting the state of the workflow session may then be used to interact with the workflow session, as illustrated in a block 322. The interaction with the workflow session from the new platform may be implemented by providing a workflow session emulator on the new platform that uses the session key to establish a current state of the workflow session for the user interface on the new platform. In such an instance, input and output may be provided to and derived from a controller of the system directly, effectively bypassing the user interface of the central console. Alternatively, or in addition, the new platform can provide user input to a workflow session instead of the central console, and receive outputs from the workflow session instead of the central console. According to this alternative, the new platform need not implement a workflow session emulator, and can be provided instead with a less complex user interface emulator. These alternatives can permit multiple workflow sessions to operate in parallel, or as a single entity that provides user interface interaction with different devices, depending on the location of the current user interface. For example, the current interface may be identified as mobile device 112, or as console 110, or both. In some embodiments, some workflow sessions can be directed to have console 110 serve as the user interface, while some workflow sessions can be directed to have mobile device 112 serve as the user interface. Accordingly, multiple workflow sessions can be operating simultaneously, and controlled or observed at either console 110 or mobile device 112. In any case, obtaining a session key at a given user interface platform permits that platform to assert control over the user interface for a given workflow session, and cause some or all other platforms to be excluded from user interface interaction. The enablement of a user interface at a new platform with a current session-state is illustrated in a block 324 of flowchart 300.

Although the present disclosure describes a target device as generally being a computing device, the disclosed systems and methods can be generally implemented with target devices, systems or methods that may not always be thought of in terms of computing devices. Examples of such targets that may employ the presently disclosed systems and/or methods include televisions, mobile phones, automotive vehicles, medical instrumentation, as well as typical targets for software updates such as database applications or embedded systems. In general, the disclosed systems or methods may be applied with any type of processing system that executes software.

The operations herein described are purely exemplary and imply no particular order. Further, the operations can be used in any sequence when appropriate and can be partially used. With the above embodiments in mind, it should be understood that the disclosed systems, devices, methods and/or uses can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described herein that form part of the present disclosure are useful machine operations. The present disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of the present disclosure. It will be apparent; however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the functions described herein may be performed by a processor executing program instructions out of a memory or other storage device. Therefore, it is the object of the appended claims to cover all such variations and modifications as come within the true spirit and scope of the present disclosure.

What is claimed is:

1. A computer implemented system for managing a process, comprising:
   a first computer device, having a respective first processor and a respective first input/output interface, and a second computer device, having a respective second processor and a respective second input/output interface;
   the first processor of the first computer device operative to access and execute instructions in a respective memory to
      implement a process that includes a set of states that describe a status of the process, provide an indication of process status and accept user commands for enabling a user to interact with the process at the first input/output interface, generate a token that identifies the process and the set of states, present indicia, via the first input/output interface, that represent the token to thereby permit the indicia to be interpreted by the second input/output interface of the second computer device such that the token can be received by the second computer device, receive an initial message to indicate that the token identifying the process and the set of states has been provided to the second computer device, and discontinue providing the indication of process status and accepting user commands for enabling the user to interact with the process at the first input/output interface upon receiving the initial message; and the second processor of the second computer device operative to access and execute instructions in a respective memory to receive the indicia presented via the first input/output interface, interpret the indicia to receive the token identifying the process implemented by the first processor of the first computer device and the set of states, send the initial message to the first processor of the first computer device to indicate that the token identifying the process implemented by the first processor of the first computer device and the set of states has been received by the second computer device, and implement a user interface emulator, by the second processor, in response to receipt of the token by the second processor and on the basis of the process and the set of states identified by the token, for providing an indication of process status and for accepting user commands to enable the user to interact with the process, implemented by the first processor, at the second input/output interface according to the set of states.

2. The system according to claim 1, wherein the process comprises a session for controlling a device.

3. The system according to claim 1, wherein the indicia comprise one or more of light signals, radio signals, electrical signals or magnetic signals.

4. The system according to claim 1, wherein the first input/output interface comprises a display, and wherein the first processor of the first computer device is further operative to present the indicia on the display of the first input/output interface.

5. The system according to claim 4, wherein the indicia are barcodes.

6. The system according to claim 1, wherein the first processor of the first computer device is further operative to receive a subsequent message from the second processor of the second computer device to indicate that the second computer device has discontinued implementing the user interface emulator via the second input/output interface.

7. The system according to claim 6, wherein the first processor of the first computer device is further operative to resume providing an indication of process status and accepting user commands for enabling the user to interact with the process via the first input/output interface following receipt of the subsequent message.

8. The system according to claim 1, wherein the first processor of the first computer device is further operative to receive a user prompt to initiate presentation of the indicia.

9. The system according to claim 1, wherein the first processor of the first computer device is further operative to continue implementing the process while the token that identifies the process and the set of states has been transferred to the second computer device via interpretation of the indicia by the second processor of the second computer device.

10. A computer implemented method for managing a process, comprising:

implementing, by a first computer device having a first processor and a first input/output interface, the process that includes a set of states that describe a status of the process;

providing, via the first input/output interface, an indication of process status and accepting user commands to enable user interaction with the process implemented by the first computer device;

generating a token, by the first computer device, that identifies the process and the set of states;

presenting indicia, that represent the token, by the first input/output interface to thereby permit the indicia to be interpreted by a second computer device such that the token can be received by the second computer device;

interpreting, by the second computer device via a respective second input/output interface, the indicia to receive the token identifying the process and the set of states;

implementing a user interface emulator, by the second processor at the second input/output interface in response to receipt of the token by the second processor and on the basis of the process and set of states identified by the token, for providing an indication of the process status and for accepting user commands to enable user interaction with the process implemented by the first computer device via the second input/output interface;

receiving, by the first computer device, an initial message to indicate that the token identifying the process implemented by the first computer device and the set of states has been received by the second computer device; and discontinuing providing the indication of process status and accepting user commands via the first input/output interface for the process implemented by the first computer device upon receiving the initial message.

11. The method according to claim 10, wherein the process comprises a session for controlling a device.

12. The method according to claim 10, wherein presenting the indicia further comprises presenting one or more of light signals, radio signals, electrical or magnetic signals.

13. The method according to claim 10, wherein presenting the indicia further comprises displaying the indicia on a display of the first input/output interface of the first computer device.

14. The method according to claim 13, wherein the indicia are barcodes.

15. The method according to claim 10, further comprising receiving, by the first computer device, a subsequent message from the processor of the second computer device for indicating that the second computer device has discontinued implementing the user interface emulator.

16. The method according to claim 15, further comprising resuming providing an indication of process status and accepting user commands to enable a user to interact with the process implemented by the first processor of the first computer device via the first input/output interface of the first computing device upon receipt of the subsequent message.

17. The method according to claim 10, further comprising receiving, by the first processor of the first computer device, a user prompt to initiate presentation of the indicia.

18. The method according to claim 10, further comprising continuing to execute the process by the first processor of the first computer device while the token that identifies the process and the set of states has been transferred to the second computer device via interpretation of the indicia by the second processor of the second computer device.

* * * * *